Jan. 17, 1961

H. O. SCHJOLIN ET AL 2,968,368

FLUID-COOLED VEHICLE DISC BRAKE

Filed Feb. 12, 1958

INVENTORS
HANS O. SCHJOLIN
DONALD K. ISBELL
BY

THEIR ATTORNEY

Jan. 17, 1961 H. O. SCHJOLIN ET AL 2,968,368
FLUID-COOLED VEHICLE DISC BRAKE

Filed Feb. 12, 1958 2 Sheets-Sheet 2

INVENTORS
HANS O. SCHJOLIN
DONALD K. ISBELL
BY
D. C. Staley
THEIR ATTORNEY

United States Patent Office 2,968,368
Patented Jan. 17, 1961

2,968,368

FLUID-COOLED VEHICLE DISC BRAKE

Hans O. Schjolin, Birmingham, and Donald K. Isbell, Pontiac, Mich., assignors to General Motors Corporation, Detroit, Mich., a corporation of Delaware Filed Feb. 12, 1958, Ser. No. 714,774

5 Claims. (Cl. 188—72)

This invention relates to a brake and, more specifically, to a fluid-cooled vehicle bearing and disc brake.

The increased carrying capacity and increased speed of trucks requires a heavy-duty brake, and in some cases, a brake which is cooled by some fluid means would be advantageous. This is especially true in mountainous areas or congested areas where the brakes need to be used quite regularly. Considerable heat is generated within the brake discs and is localized in a very small area which may cause high stress with possible deformation of the metal parts and rapid wearing of the brake linings. This increased load also places an additional stress on the bearings which may cause over-heating.

It is an object of this invention to provide a fluid-cooled bearing and disc brake for more favorable operating conditions. The invention provides fluid passages through the antifriction bearing chamber, and through the braking means for circulating a cooling fluid, and thereby maintaining a relatively constant temperature throughout the bearing assembly and the braking means.

A further object is to provide a brake assembly mounted outboard of the bearing assembly to allow complete dismantling of the brake assembly without changing the bearing adjustment or dismantling any part of the bearing assembly.

A further object of this invention is to provide a step pressure gradient in a fluid-cooled brake system from the high-pressure side of the fluid system to the low-pressure side and then to the atmosphere. This provides a positive seal from the high pressure side of the fluid system to the atmosphere.

Further objects and advantages of the present invention will be apparent from the following description, reference being had to the accompanying drawings wherein a preferred embodiment of the present invention is clearly shown.

Figure 1:
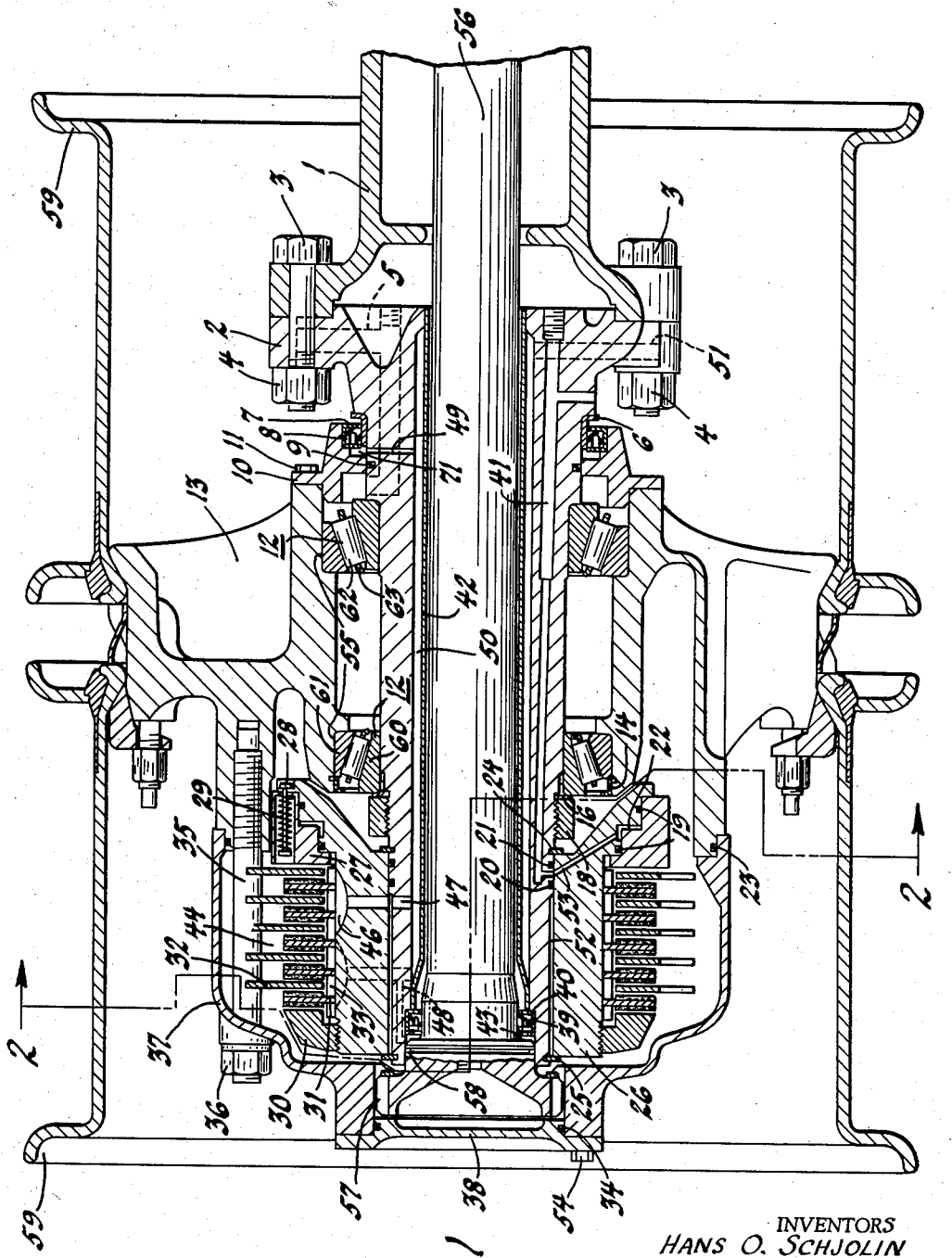
Fig. 1 is a cross section view through the center line of the wheel shaft and viewed perpendicularly to the center line of the wheel shaft.
Figure 2:
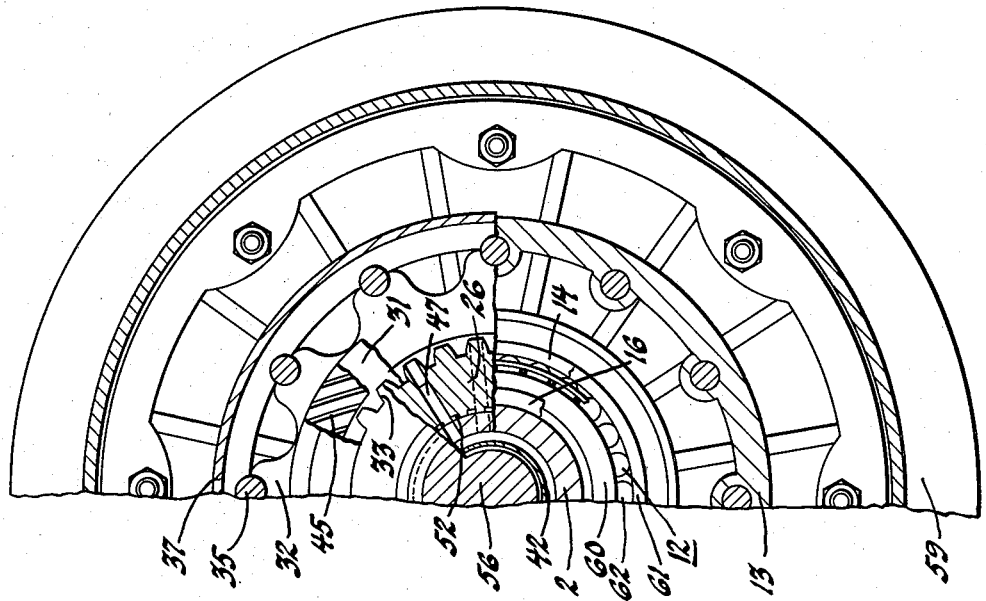
Fig. 2 is a cross section view a shown by arrows 2—2 in Fig. 1. Certain portions of this view are broken away to clarify the location of various parts.
Figure 3:
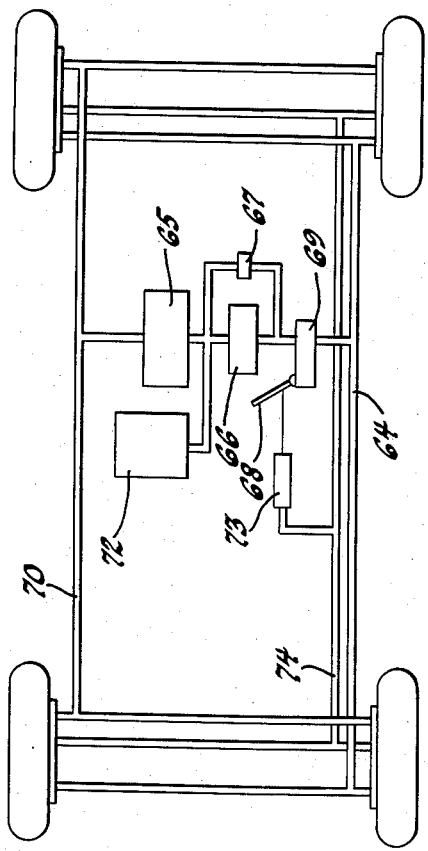
Fig. 3 is a view of the fluid system for creating pressure for circulation of the fluid through the bearing and braking assembly.

The structure of the invention comprises generally of a shaft housing means 1 and shaft housing extension 2 for the drive shaft 56. A bearing assembly 12 is mounted about the periphery of shaft housing extension 2 and a wheel 13 is rotatably mounted on said bearing. Dual rims 59 are mounted with the adjacent portions of the rims contacting the outer periphery of the wheel 13. The brake assembly is generally shown within the brake housing 37 and is mounted outboard from the wheel 13 and bearing assembly 12. The drive shaft 56 is spline-connected at 57 to the brake housing 37.

A detailed illustration is shown in Fig. 1, the shaft housing 1 extends from the differential of a truck. This housing 1 is bolted to the shaft housing extension 2 by means of bolts 3 and nuts 4. A passage 5 is provided within said shaft housing 2 and connects an inboard fluid transmission line 64 to a chamber adjacent to the bearing assembly 12. The bearing assembly 12 is mounted within a bearing chamber 55 formed by the shaft housing extension 2 and the hub section of wheel 13. The bearing assembly comprises the inner race 60, the outer race 61, antifriction element such as a roller 62, and cage 63. The wheel 13 is rotatably mounted on the bearing assembly 12. A seal housing 10 is bolted inboard to the hub portion of the wheel by means of bolts 11. A high-pressure seal 9 is inserted in shaft housing extension 2 on the inner periphery of seal housing 10. Fluid passage 49 leads, from the lower pressure of the fluid cooling system, to a chamber 71 adjacent seal 9 but on the opposite side of the high-pressure fluid.

A seal seating ring 6 is mounted just inboard of said low-pressure chamber 71 and about the outer periphery of the shaft housing extension 2. A low-pressure seal assembly is mounted on the seal ring 6 within the inboard edge of the seal housing 10. This seal assembly comprises, a seal retainer 7, and a resilient member 8 which bears upon the retainer 6.

Dual rims 59 are mounted about the outer periphery of the wheel 13. The rims are centrally mounted on wheel 13 with the adjacent portion of the rims bearing on the wheel.

Shaft 56 extends outboardly through the shaft housing extension 2 and is spline-connected at 57 to the brake housing 37. An end plate 38 is mounted on the end of the brake housing 37 by means of nuts 54. A seal 34 is mounted on the inner periphery at the outboard edge of the brake housing 37 and the outer periphery of end plate 38. Housing 37 is connected to the hub section of wheel 13 by means of stud bolts 35 and nuts 36. A seal 23 is also provided on the inner periphery of the inboard edge of the brake housing. The shaft 56, brake housing 37, and wheel 13 rotate as a unit.

The rotating discs 32 are mounted on the inner portion of stud bolts 35. The stationary discs 31 are spline-connected at 33 to the stationary brake disc mounting 26. The stationary brake disc mounting 26 is spline-connected to the shaft housing extension 2 as shown at 52. A back-up plate 30 is threadedly mounted on the stationary brake disc mounting 26 at the outboard portion of said mounting. The pressure plate 27 is mounted inboard of the stationary disc 31 and around the outer periphery of the inboard portion of the stationary brake disc mounting 26.

The pressure plate 27 operates in a motion parallel to the center line of the shaft 56 by means of fluid in chamber 22. A releasing spring 29 is connected to pin 28 on the inner portion of the pressure disc 27. A seal 19 is provided inboard and outboard of said fluid chamber 22. This fluid chamber 22 is connected by a passage 53 to the inlet passage 41 of the brake actuating system. Snap rings 24 and 25 are mounted on the outer periphery of the outboard end of shaft housing extension 2. These snap rings maintain the position axially of the stationary brake disc mounting 26.

An adjustable member 18 is shown threadedly mounted just outboard of the bearing assembly 12. This member may be rotated to create pressure on seating ring 16 and thereby provide the proper bearing adjustment of the bearing assembly 12. A snap ring is also located at 14 on the inner periphery of the hub portion of the wheel 13.

A seal 58 is provided on the outboard end of the shaft housing extension 2. The high-pressure seal 58 is mounted just inboard of the enlarged spline portion of the shaft 56. A passage 48 is provided from the low-pressure side of the hydraulic system to a point adjacent the high-pressure seal and on the opposite side of the high-pressure fluid. This passage 48 provides a drainage means for any leakage from the high-pressure side of the hydraulic system. An additional seal is provided inboard of this passage 48 which comprises a snap ring 43, a retainer 40 and a resilient sealing member 39.

A sleeve 42 is mounted internally on the shaft housing extension 2 which bears against the shaft housing only at the extreme ends. The center portion of the internal sleeve 42 is mounted in spaced relation from the shaft housing extension 2 and thereby provides a passage 50 for the return side of the cooling fluid system.

The fluid system throughout the wheel and brake assembly comprises as follows: Passage 5 in shaft housing 2 connects an input cooling fluid line 64 with a chamber adjacent the bearing assembly 12, the passage extends through the bearing chamber 55 within the inner periphery of the hub section of wheel 13. The passage continues outboard from the bearing assembly adjacent to the inboard side of the stationary brake disc mounting 26, and thence radially to a reservoir chamber 44 about the outer periphery of the brake discs 31 and 32. Grooves 45 are provided on the brake discs to allow fluid to pass from the high-pressure side of the system to the low-pressure side through these grooves 45. An additional reservoir 46 is provided on the inner periphery of the brake discs. This reservoir is connected by means of a passage 47 to the passage 50 created by the internal sleeve 42 mounted in spaced relation to the shaft housing extension 2. The passage 50 has an outlet passage 51 on the inboard end which connects the fluid transmission line 70 on the low side of the hydraulic pump.

The pumping and transmission system for the fluid medium comprises of the following: The fluid transmission lines 64 and 70 connect the inlet and outlet points respectively on the shaft housing extension 2. A cooler 65 is placed on the low-pressure side of the system adjacent to the reservoir 72 which is connected to the pump 66. A by-pass valve 67 is provided for by-pass of fluid around the pump 66 when the fluid is not needed for cooling of the bearing and the brake means. The control valve 69 is operated by a brake pedal 68 which is mounted on the high side of the fluid system. The fluid-operating system is shown as the conventional master cylinder 73 operated by a pedal, thereby creating pressure through the fluid lines 74 to the passages 41 and 53 and the wheel cylinder 22.

The operation of the fluid-cooled bearing and brake means will now be described. As the brake pedal is depressed, a valve 69 is actuated allowing hydraulic fluid to pass from the high-pressure side of the system into the passage 5 of the shaft housing extension 2. The fluid passes through the bearing chamber 55 and thereby maintaining a low temperature operating condition. A fluid continues through the passage to the outer periphery of the brake discs 31 and 32 in chamber 44. Due to the high pressure of the hydraulic system, the fluid passes inward through the grooves 45 on the brake discs and thereby provides a cooling of the braking mechanism to maintain a safe operation even under severe braking. The fluid is circulated then through passages 47 and 50 thereby providing cooling of the shaft housing extension along almost its entire length. This provides a low temperature throughout the whole bearing assembly and braking means. The fluid then passes out the passage 51 to the fluid transmission line 70 and back to the low side of the hydraulic pump. The provision of the passages 48 and 49 to a point outside of the high pressure hydraulic seal eliminates the danger of excessive leakage of the high-pressure hydraulic system as shown. The additional seal between the low-pressure side and the atmosphere is subjected to very little leakage because the pressure is quite low in this part of the system.

The dual rims 59 are centrally located on wheel 13 by mounting the adjacent portions of each rim on the wheel. The brake assembly is mounted completely outboard of the bearing assembly. A bell housing 37 completely encloses the braking device by extending inboard to a point just beyond the brake disc which is farthest axially inboard. The bell housing 37 may be removed by removing nuts 36 and the brake assembly may be further removed by removing the necessary snap rings and stud bolts. The bearing adjustment is not changed in any manner from the dismantling of the brake assembly.

While the embodiments of the present invention as herein disclosed constitute a preferred form, it is to be understood that other forms might be adapoted.

What is claimed is as follows:

1. A brake comprising, in combination, a wheel, a bearing chamber forming a passage within the hub section of said wheel, a rotating brake housing member connected to said wheel, one or more rotating brake discs carried by the brake housing member, a stator member within said housing member, one or more stationary brake discs mounted on the stator member, grooves on one or more of said discs, a shaft housing member connected to said stator member, cooling fluid inlet passage means including fluid passage means within the walls of said shaft housing, said bearing chamber in said wheel, passage means from the outboard side of said bearing chamber to the outer periphery of said brake, return passage means including passage means from the inner periphery of said brake discs to the inner periphery of said shaft housing, an internal sleeve mounted within said shaft housing member with the end portions closely fitting the shaft housing and the center portion of said sleeve in spaced relation to said housing thereby providing a fluid passage means between said shaft housing and internal sleeve, means for circulating cooling medium through said passage means and said grooves on said discs, and thereby providing cooling of said brake discs.

2. In a vehicle disc brake of the character described, the combination of a rotating assembly comprising, a wheel, a brake housing connected to said wheel, rotating discs mounted within said brake housing, a drive shaft extending through said wheel and connected to said brake housing, a stator assembly comprising a shaft housing enclosing said rotating shaft, an internal sleeve mounted within said shaft housing member with the end portions closely fitting the shaft housing and the central portion of said sleeve in spaced relation to said housing to form a longitudinal extending passage means between said shaft housing and said internal sleeve, a bearing assembly mounted on the outer periphery of said shaft housing, said bearing assembly mounted within a bearing chamber formed within the hub section of said wheel, a stator member mounted concentrically on said shaft housing outboard from said bearing assembly, stationary discs mounted on said stator member for frictionally engaging said rotating brake discs, grooves formed in at least one of said discs, inlet passage means for cooling fluid comprising, passage means in said shaft housing extending from the inboard side of said housing axially to a point adjacent the bearing chamber in said hub section of said wheel, said bearing chamber in said hub section of said wheel providing axial passage means from said passage means in said shaft housing, passage means extending from the outboard side of said bearing chamber radially outward and then axially outboard about the outer periphery of said brake discs, fluid passage means extending from the outer periphery of said brake discs to the outboard side of said braking discs to a point adjacent to the outer periphery of the outboard end of said drive shaft, return passage means from said brake discs including radially extending passages from the inner periphery of said brake discs to the inner periphery of said shaft housing, said longitudinally extending passage means formed between the inner periphery of said shaft housing and the outer periphery of said internal sleeve, a double seal mounted between the rotating assembly and the stator assembly on the inboard and outboard end to provide sealing for the inlet passage means, passage means extending from the outlet passage means to a point between said double seals thereby providing a reduced pressure on the outer seal of said double seal means to insure a minimum of leakage from said fluid cooling passage means.

3. In a vehicle disc brake of the character described comprising in combination, a drive shaft, a shaft housing enclosing said drive shaft, a bearing assembly mounted about the outer periphery of said shaft housing, a wheel rotatably mounted about the outer periphery of said bearing assembly, a bearing chamber for reception of said bearing assembly providing longitudinal passage means through said bearing chamber, a brake housing connected to said wheel and extending outboard and radially inward to enclose the outboard end of said drive shaft, inlet passage means including a passage means from the inboard side of said shaft housing and extending longitudinally outboard to a point adjacent the bearing assembly, said bearing chamber in said hub section of the wheel forming an extending portion from said passage means in said shaft housing, passage means extending from the outboard end of said bearing assembly radially outward and axially outboard about the inner periphery of said brake housing, a brake assembly including a stator member mounted on the outer periphery of said shaft housing outboard from said bearing assembly, stator discs mounted on the outer periphery of said stator member, rotating discs mounted on the inner periphery of said brake housing, grooves formed on at least one of said brake discs to provide passage means from the outer periphery of said brake discs to the inner periphery of said brake discs, return passage means including radial passages extending from the inner periphery of said brake discs to the inner periphery of said shaft housing, an internal sleeve mounted on the inner periphery of said shaft housing having the inboard end and the outboard end closely fitted to said shaft housing and the central portion of said internal sleeve forming a longitudinal passage for returning fluid from the radial passages in the outboard end of said shaft housing to outlet passages in the inboard end of said shaft housing, an external and an internal seal mounted within the inner periphery of the inboard side of said wheel and contacting the outer periphery of said shaft housing, passage means extending from a point between said internal and said external seal to the outlet passage means for said fluid cooling system, a second internal and external seal mounted on the outboard side of the shaft housing and the inner periphery of said shaft housing and the outer periphery of said shaft, a second passage means extending from a point between said second internal seal and said second external seal to said outlet passage means thereby providing a high pressure internal seal and a low pressure external seal to prevent leakage from said fluid cooling system.

4. In a vehicle disc brake assembly of the character described in combination comprising, a vehicle drive shaft, a shaft housing enclosing said drive shaft, a bearing assembly mounted about the outer periphery of said shaft housing, a wheel rotatably mounted about the outer periphery of said bearing assembly, a bearing chamber formed in the inner periphery of the hub section of said wheel for reception of said bearing assembly thereby providing axial passage through said bearing chamber, a brake assembly mounted outboard of said bearing assembly on said shaft housing and including a stator member, stator discs mounted on the outer periphery of said stator member, a brake housing enclosing said brake discs, rotor brake discs mounted on the inner periphery of said brake housing for engagement with said stator discs, said brake housing enclosing said brake discs and connected to said wheel and said drive shaft, a fluid cooling means having inlet passage means including passage means from the inboard side of said shaft housing longitudinally extending through said shaft housing to a point adjacent the bearing chamber in the hub section of said wheel, passage means through the bearing chamber of said wheel, passage means extending radially outwardly between said brake assembly and said wheel and axially outboard about the outer periphery of said brake discs, said fluid passage means about the outer periphery of said brake discs extending outboard between the brake discs and the inboard side of said brake housing to a point adjacent the drive shaft, said brake discs having passage means extending radially inward to the inner periphery to permit transfer of cooling fluid between said brake discs, a return fluid cooling passage means including passage means from the inner periphery of said brake discs to the inner periphery of said shaft housing, a longitudinally extending sleeve mounted on the inner periphery of said shaft housing and having a sealed mounting on inboard and outboard end of said sleeve with the intermediate portion of said internal sleeve forming a longitudinal passage means from said passage means to the inner periphery of said shaft housing on its outboard end to an outlet passage on the inboard end of said shaft housing, means for circulating a cooling fluid through said passage means thereby providing a brake cooling system whereby said cooling fluid passes around the outer periphery and inner periphery as well as the inboard and outboard end of the braking structure.

5. In a vehicle disc brake of the character described comprising, a shaft, a shaft housing enclosing said shaft, a bearing mounted about the outer periphery of said shaft housing, a wheel rotatably mounted about the outer periphery of said bearing, a bearing chamber on the inner periphery of the hub section of said wheel for receiving said bearing and forming an axial passage through the hub section of said wheel, a brake assembly including a stator member mounted on the outer periphery of the outboard end of said shaft housing, stator discs mounted on the outer periphery of said stator member, a brake housing connected to said wheel and extending about the outer periphery of said brake assembly and enclosing the outboard end of said shaft, and connecting to said shaft, rotating discs mounted to said brake housing for engagement with said stationary discs, grooves formed to provide passage means between said discs, a fluid cooling system including passage means extending longitudinally through said shaft housing from the inboard end of said shaft housing to a point adjacent the bearing assembly in said wheel, said axial passage formed by said bearing chamber, passage means from the outboard end of said bearing chamber to the outer periphery of said brake discs, said grooves formed on said brake discs, return passage means extending from the inner periphery of said brake discs to the inner periphery of said shaft housing, passage means extending along the inner periphery of said shaft housing to the inboard end connected to outlet passage means from said shaft housing, means for providing circulation of the cooling fluid through said fluid cooling system.

References Cited in the file of this patent
UNITED STATES PATENTS

| | | |
|---|---|---|
| 1,174,678 | Carpenter et al. | Mar. 7, 1916 |
| 1,800,879 | Tessky | Apr. 14, 1931 |
| 2,466,320 | Lawrence | Apr. 5, 1949 |
| 2,690,248 | McDowall | Sept. 28, 1954 |
| 2,773,552 | Schjolin et al. | Dec. 11, 1956 |
| 2,775,331 | Peterson | Dec. 25, 1956 |
| 2,788,870 | Heck | Apr. 16, 1957 |
| 2,793,714 | Luenberger | May 28, 1957 |
| 2,831,357 | Kelley et al. | May 20, 1958 |
| 2,842,226 | Liebel | July 8, 1958 |

FOREIGN PATENTS

| | | |
|---|---|---|
| 770,502 | Great Britain | Mar. 20, 1957 |